United States Patent
Maier

(10) Patent No.: US 10,746,881 B2
(45) Date of Patent: Aug. 18, 2020

(54) MEASURING DEVICE AND MEASURING METHOD FOR TESTING A LOCATION TRACKING EMPLOYING REAL TIME KINEMATICS

(71) Applicant: Rohde & Schwarz GmbH & Co. KG, Munich (DE)

(72) Inventor: Stefan Maier, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 369 days.

(21) Appl. No.: 15/672,677

(22) Filed: Aug. 9, 2017

(65) Prior Publication Data
US 2019/0049591 A1 Feb. 14, 2019

(51) Int. Cl.
- G01S 19/23 (2010.01)
- G01S 19/12 (2010.01)
- G01S 19/20 (2010.01)
- G01S 19/03 (2010.01)
- G01S 19/43 (2010.01)

(52) U.S. Cl.
CPC ............ G01S 19/23 (2013.01); G01S 19/03 (2013.01); G01S 19/12 (2013.01); G01S 19/20 (2013.01); *G01S 19/43* (2013.01)

(58) Field of Classification Search
CPC .......... G01S 19/23; G01S 19/12; G01S 19/20
USPC .................................................. 342/357.58
See application file for complete search history.

(56) References Cited

U.S. PATENT DOCUMENTS

| | | | | |
|---|---|---|---|---|
| 5,610,614 A | * | 3/1997 | Talbot | G01C 15/00 342/352 |
| 6,127,970 A | * | 10/2000 | Lin | G01S 19/23 342/357.31 |

(Continued)

FOREIGN PATENT DOCUMENTS

| | | | | |
|---|---|---|---|---|
| WO | WO-2013154973 A1 | * | 10/2013 | ........... H04B 17/318 |
| WO | WO-2013192156 A1 | * | 12/2013 | ............. G01S 19/28 |

OTHER PUBLICATIONS

Gupta, "How to Use GNSS Simulators to Test RTK Positioning Systems", Spirent Blogs, How to Use GNSS Simulators to Test RTK Positioning Systems, https://www.spirent.com/Blogs/Positioning/2016/February/HowToUseGNSSSimulatorsTestRTK, Feb. 1, 2016.

(Continued)

*Primary Examiner* — Vladimir Magloire
*Assistant Examiner* — Nuzhat Pervin
(74) *Attorney, Agent, or Firm* — Potomac Technology Law, LLC

(57) ABSTRACT

A measuring device serves the purpose of testing a location tracking of a device under test. The measuring device comprises a global navigation satellite system simulator adapted to wirelessly transmit a radio frequency global navigation satellite system signal to a device under test, and a base station simulator adapted to wirelessly transmit a real-time kinematic signal to the device under test. The measuring device is adapted to compare a location, determined by the device under test based on the radio frequency global navigation satellite system signal and the real-time kinematic signal, with an ideal location, upon which the radio frequency global navigation satellite system signal and the real-time kinematic signal are based.

17 Claims, 4 Drawing Sheets

(56) References Cited

U.S. PATENT DOCUMENTS

| | | | | |
|---|---|---|---|---|
| 6,618,004 B2* | 9/2003 | Fenton | G01S 19/071 | 342/357.21 |
| 6,735,523 B1* | 5/2004 | Lin | G01S 19/23 | 342/357.31 |
| 7,797,132 B1* | 9/2010 | Lele | G01C 25/00 | 702/181 |
| 7,800,533 B2* | 9/2010 | Harper | G01S 19/215 | 342/357.58 |
| 7,940,213 B2* | 5/2011 | Harper | G01S 19/215 | 342/357.59 |
| 8,035,557 B2* | 10/2011 | Thomson | G01S 19/215 | 342/357.43 |
| 8,325,087 B2* | 12/2012 | Thomson | G01S 19/215 | 342/357.43 |
| 8,854,260 B2* | 10/2014 | Boulton | G01S 19/23 | 342/169 |
| 9,285,479 B2* | 3/2016 | O'Connor | G01S 19/42 | |
| 9,519,063 B2* | 12/2016 | Davis | G01S 19/23 | |
| 10,335,962 B1* | 7/2019 | Rosenberg | B25J 19/0095 | |
| 2003/0148761 A1* | 8/2003 | Gaal | G01S 19/23 | 455/423 |
| 2008/0147324 A1* | 6/2008 | Garin | G01S 19/24 | 701/469 |
| 2009/0303116 A1* | 12/2009 | Wirola | G01S 19/29 | 342/357.26 |
| 2010/0127920 A1* | 5/2010 | Harper | G01S 19/215 | 342/357.58 |
| 2010/0127923 A1* | 5/2010 | Harper | G01S 19/215 | 342/357.45 |
| 2010/0127928 A1* | 5/2010 | Thomson | G01S 19/215 | 342/357.45 |
| 2011/0071755 A1* | 3/2011 | Ishigami | G01C 21/165 | 701/478.5 |
| 2011/0243194 A1* | 10/2011 | Vourc'h | G01C 21/165 | 375/140 |
| 2011/0291887 A1* | 12/2011 | Pulford | G01S 19/20 | 342/357.58 |
| 2012/0026037 A1* | 2/2012 | Thomson | G01S 19/215 | 342/357.43 |
| 2012/0286991 A1* | 11/2012 | Chen | G01S 19/32 | 342/357.23 |
| 2013/0201055 A1* | 8/2013 | Hadef | G01S 19/23 | 342/357.25 |
| 2013/0271317 A1* | 10/2013 | Goel | H04B 17/318 | 342/357.62 |
| 2013/0342393 A1* | 12/2013 | O'Connor | G01S 19/28 | 342/357.25 |
| 2014/0043187 A1* | 2/2014 | Ellum | G01S 19/04 | 342/357.27 |
| 2014/0225773 A1* | 8/2014 | Boulton | G01S 19/23 | 342/357.62 |
| 2014/0225774 A1* | 8/2014 | Boulton | G01S 19/23 | 342/357.62 |
| 2014/0253372 A1* | 9/2014 | Davis | G01S 19/23 | 342/357.42 |
| 2014/0301434 A1* | 10/2014 | Kohda | H04B 17/104 | 375/227 |
| 2015/0246654 A1* | 9/2015 | Tadic | G01P 15/02 | 340/436 |
| 2015/0301191 A1* | 10/2015 | Wallace | G01S 19/43 | 342/357.42 |
| 2015/0331099 A1* | 11/2015 | Wu | G08G 5/0008 | 342/32 |

OTHER PUBLICATIONS

Spectracom, "GPS Testing with a Virtual Reference Station", GPS simulators stream RTCM correction data messages for testing a RTK/DGNSS receiver, Spectracom, https://spectracom.com/productsservices/gnsssimulation/rtkdgnssvirtualreferencestationoption, 1995.

* cited by examiner

MEASURING DEVICE AND MEASURING METHOD FOR TESTING A LOCATION TRACKING EMPLOYING REAL TIME KINEMATICS

TECHNICAL FIELD

The invention relates to a measuring device and a measuring method for testing the location tracking of a device under test, and more specifically to testing the ability of a device under test to process global navigation satellite system signals and real-time kinematic signals.

BACKGROUND

Global navigation satellite systems have been in operation for decades now. The accuracy of such systems is only in the range of several dozens of meters. Only by employing ground-based reference stations, the accuracy can be increased. In order to do so, real-time kinematics are used. For example, in a mobile telephone system, a base station sends real-time kinematic signals to mobile stations in order to increase the accuracy of the built-in global navigation satellite system receivers of the mobile stations.

For example U.S. Pat. No. 9,519,063B2 shows such a global navigation satellite system using real-time kinematics.

Accordingly, there is a need for a measuring device and a measuring method able to evaluate the ability of a device under test to process global navigation satellite system signals and real-time kinematic signals.

SOME EXAMPLE EMBODIMENTS

Embodiments of the present invention advantageously address the foregoing requirements and needs, as well as others, by providing a measuring device and a measuring method able to evaluate the ability of a device under test to process global navigation satellite system signals and real-time kinematic signals.

According to a first aspect of the invention, a measuring device is provided. The measuring device is configured for testing a location tracking of a device under test. The measuring device comprises a global navigation satellite system simulator and a base station simulator. The global navigation satellite system simulator is adapted to transmit a radio frequency global navigation satellite system signal over the air to a device under test. The base station simulator is adapted to transmit a real-time kinematic signal over the air to the device under test. The measuring device is adapted to compare a location (determined by the device under test based on the radio frequency global navigation satellite system signal and the real-time kinematic signal) with an ideal location (upon which the radio frequency global navigation satellite system signal and the real-time kinematic signal are based). It is thereby possible to evaluate the performance of the device under test under very realistic conditions.

According to a first implementation form of the first aspect, the radio frequency global navigation satellite system signal and/or the real-time kinematic signal comprise at least one intentional error. The measuring device is adapted to determine a reaction of the device under test to the at least one intentional error. Thereby it is possible to determine if the device under test performs correctly even when presented with erroneous signals.

According to a further implementation form of the first aspect, the at least one intentional error is based on an ionospheric grid model, wherein a real-time kinematic model (upon which the real-time kinematic signal is based) differs from a global navigation satellite system model (upon which the radio frequency global navigation satellite system signal is based). It is thereby very easy to introduce artificial error into the signals.

According to a further implementation form of the first aspect, an orbit model used for determining the radio frequency global navigation satellite system signal differs from an orbit model used for determining the real-time kinematic signal. This alternative also allows for a very simple implementation of the errors into the signals.

According to a further implementation form of the first aspect, the base station simulator is a Long Term Evolution (LTE) base station simulator. The base station simulator is then adapted to send the real-time kinematic signal as part of an LTE system information block or as a part of an LTE positioning protocol message (LPP) or via LPPe. This allows for a very simple transmission of the real-time kinematic information.

According to a further implementation form of the first aspect, the base station simulator is a Universal Mobile Telecommunications Service (UMTS) base station simulator. This allows for testing a very wide variety of devices under test.

According to a further implementation form of the first aspect, the measuring device is adapted to determine whether the device under test uses receiver autonomous integrity monitoring, when a simulated satellite of the radio frequency global navigation satellite system signal and/or the real-time kinematic signal is mis-broadcasting. Additionally or alternatively, the measuring device is adapted to determine whether the device under test has a failsafe, when the device under test is unable to find appropriate data. Additionally or alternatively, the measuring device is adapted to determine whether the device under test disregards real-time kinematic data within the real-time kinematic signal, when the real-time kinematic data does not perform at a required standard. This allows for accurately determining, if the device under test can perform an accurate location tracking even in adverse circumstances.

According to a further implementation form of the first aspect, the radio frequency global navigation satellite system signal and/or the real-time kinematic signal are recorded real-world signals in a specific real-world scenario, or are derived from recorded real-world signals in a specific real-world scenario. This allows for a very simple determining of the signals and for a very accurate measurement of the location tracking capabilities of the device under test.

According to a further implementation form of the first aspect, the real-time kinematic signal comprises correction data with regard to the radio frequency global navigation satellite system signal. It is thereby possible to determine if the device under test can handle two different data sources correctly.

According to a further implementation form of the first aspect, the measuring device is adapted to receive a positioning response signal from the device under test, indicating the location (determined by the device under test based on the radio frequency global navigation satellite system signal and the real-time kinematic signal). It is thereby possible to evaluate within the measuring device if the location tracking is performed correctly.

According to a further implementation form of the first aspect, the base station simulator is adapted to receive a positioning response signal from the device under test, indicating the location (determined by the device under test based on the radio frequency global navigation satellite system signal and the real-time kinematic signal). It is thereby possible to evaluate within the measuring device if the location tracking is performed correctly.

According to a further implementation form of the first aspect, the radio frequency global navigation satellite system signal comprises at least one of a global positioning system (GPS) signal, a Globalnaja Nawigazionnaja Sputnikowaja Sistema (GLONASS) signal, a Galileo signal and a Beidou signal. This allows for a very simple construction of the measuring device. A GLONASS system (or global navigation satellite system) is a space-based satellite navigation system operating in the radio-navigation-satellite service (which provides an alternative to GPS and is the second navigational system in operation with global coverage and of comparable precision).

According to a further implementation form of the first aspect, the radio frequency global navigation satellite system signal comprises at least two of a GPS signal, a GLONASS signal, a Galileo signal and a Beidou signal. It is thereby possible to evaluate the location tracking performance of devices under test being able to handle two or more satellite navigation standards.

According to a second aspect of the invention, a measuring system is provided. The measuring system comprises a measuring device according to the first aspect of the invention and a device under test. The measuring device is adapted to perform measurements on the device under test. This allows for processing a feedback signal of the device under test.

According to a third aspect of the invention, a measuring method for testing a location tracking of a device under test is provided. The method comprises transmitting a radio frequency global navigation satellite system signal over the air to a device under test, transmitting a real-time kinematic signal over the air to the device under test, and comparing a location (determined by the device under test based on the radio frequency global navigation satellite system signal and the real-time kinematic signal) with an ideal location (upon which the radio frequency global navigation satellite system signal and the real-time kinematic signal are based). This allows for a very simple and accurate determining if the location tracking of the device under test operates correctly.

According to a first implementation form of the third aspect, the radio frequency global navigation satellite system signal and/or the real-time kinematic signal comprise at least one intentional error. The measuring device is then adapted to determine a reaction of the device under test to the at least one intentional error. Thereby it is possible to determine if the device under test performs correctly even when presented with erroneous signals.

According to a further implementation form of the third aspect, the at least one intentional error is based on an ionospheric grid model, wherein a real-time kinematic model (upon which the real-time kinematic signal is based) differs from a global navigation satellite system model (upon which the radio frequency global navigation satellite system signal is based). It is thereby very easy to introduce artificial error into the signals. It is thereby very easy to introduce artificial error into the signals.

According to a further implementation form of the third aspect, an orbit model used for determining the radio frequency global navigation satellite system signal differs from an orbit model used for determining the real-time kinematic signal. This alternative also allows for a very simple implementation of the errors into the signals.

According to a further implementation form of the third aspect, the measuring method further comprises determining whether the device under test uses receiver autonomous integrity monitoring, when a simulated satellite of the global navigation satellite system signal and/or the real-time kinematic signal is mis-broadcasting. Additionally or alternatively, the measuring method further comprises determining whether the device under test has a failsafe, when the device under test is unable to find appropriate data. Additionally or alternatively, the method further comprises determining whether the device under test disregards real-time kinematic data within the real-time kinematic signal, when the real-time kinematic data does not perform at a required standard. This allows for a very simple transmission of the real-time kinematic information.

According to a further implementation form of the third aspect, the radio frequency global navigation satellite system signal and/or the real-time kinematic signal are recorded real-world signals in a specific real-world scenario, or are derived from recorded real-world signals in a specific real-world scenario. This allows for a very simple determining of the signals and for a very accurate measurement of the location tracking capabilities of the device under test.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

Figure 1:
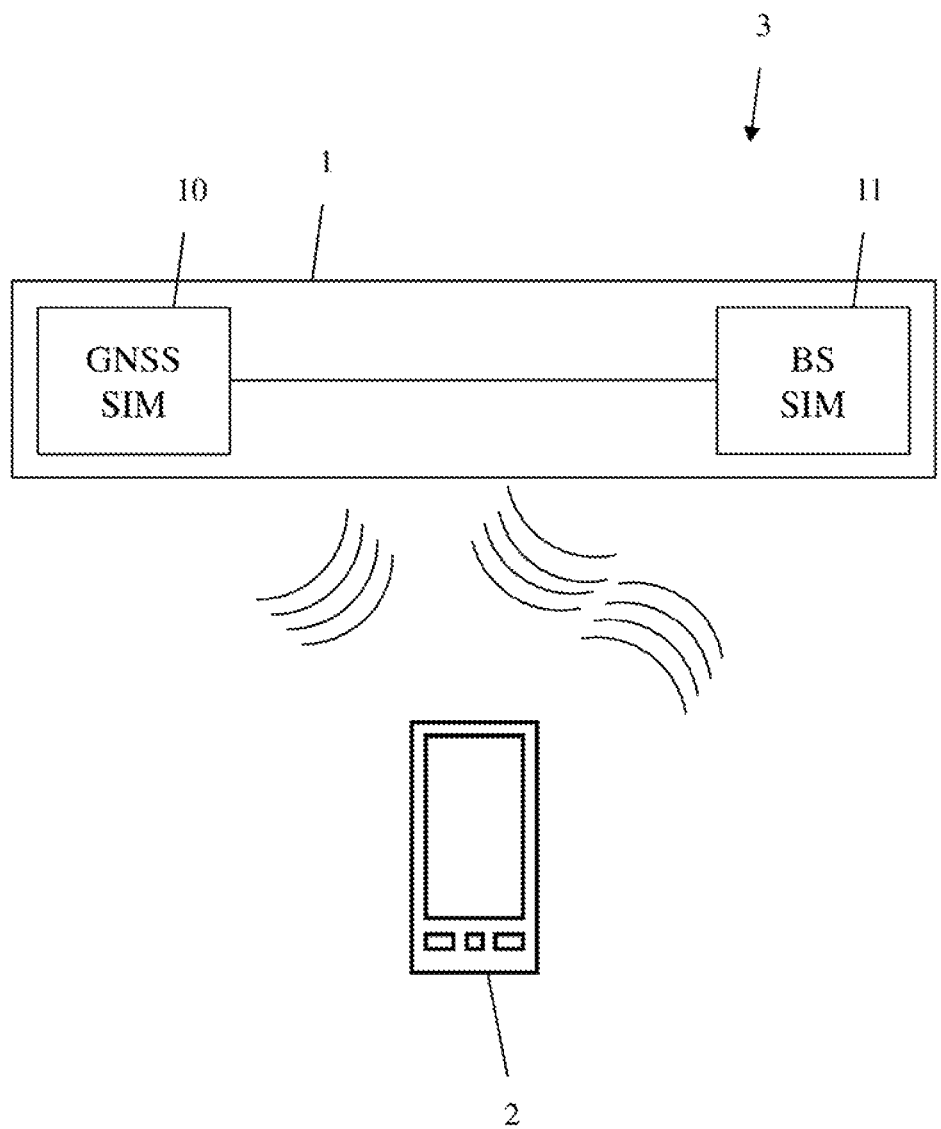
FIG. 1 shows an example block diagram of a measuring device and measuring system, for testing a location tracking of a device under test, in accordance with example embodiments of the present invention.

First, the construction and basic function of a measuring device for testing a location tracking of a device under test, according to example embodiments of the present invention, are described with respect to FIG. 1. Then, with regard to FIG. 2 and FIG. 3, details of the global navigation satellite system simulator and the base station simulator of FIG. 1, according to example embodiments of the present invention, are described. Finally, with regard to FIG. 4, the function of a method for testing a location tracking of a device under test, according to example embodiments of the present invention, is described. Similar entities and reference numbers in different figures have been partially omitted.

Reference will now be made in detail to example embodiments of the present invention, examples of which are illustrated in the accompanying drawings. However, the following embodiments of the present invention may be variously modified and the range of the present invention is not limited by the following example embodiments.

FIG. 1 shows an example block diagram of a measuring device 1 and measuring system 3, for testing a location tracking of a device under test, in accordance with example embodiments of the present invention. The measuring system 3 comprises a measuring device 1 and a device under test 2. The measuring device 1 comprises a global navigation satellite system simulator 10 connected to a base station simulator 11. The measuring device 1 is in communication connection over the air to the device under test 2.

The global navigation satellite system simulator 10 generates and transmits a radio frequency global navigation satellite system signal over the air to the device under test 2. At the same time, the base station simulator 11 is in communications connection to the device under test 2, and transmits a real-time kinematic signal over the air to the device under test 2. The measuring device 2 is adapted to compare a location (which the device under test 2 calculates based on the radio frequency global navigation satellite system signal and the real-time kinematic signal) with an ideal location (upon which the radio frequency global navigation satellite system signal and the real-time kinematic signal are based). By way of example, the base station simulator 11 receives, from the device under test 2, a location, which the device under test 2 has determined from the signals, and compares the received location to the location upon which the signals are actually based.

According to example embodiments, the base station simulator 11 and the global navigation satellite system simulator 10 can be two separate measuring devices in separate housings, but can also be integrated into a single measuring device and therefore into a single housing.

Figure 2:
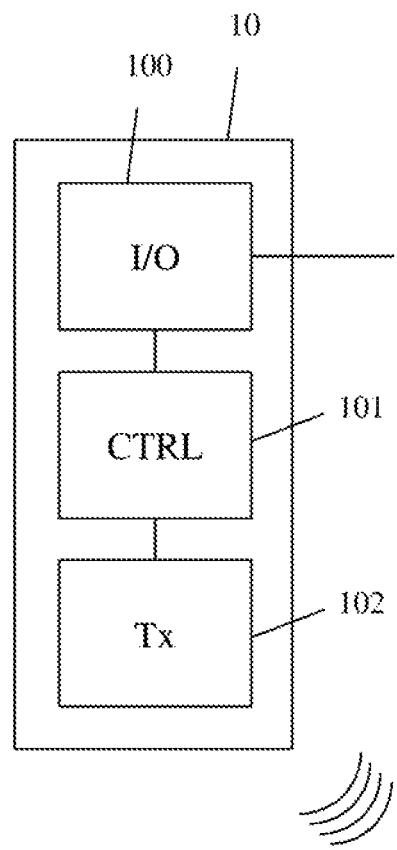
FIG. 2 shows an example block diagram of the global navigation satellite system simulator of FIG. 1, in accordance with example embodiments of the present invention.

FIG. 2 shows an example block diagram of the global navigation satellite system simulator 10 of FIG. 1, in accordance with example embodiments of the present invention. Here, the construction and function of the global navigation satellite system simulator 10 is further explained.

The global navigation satellite system simulator 10 comprises a communication device 100, which is connected to a controller 101, which in turn is connected to a transmitter 102. The controller 101 controls the communication device 100 and the transmitter 102.

The controller 101 controls the transmitter 102 to transmit the previously described radio frequency global navigation satellite system signal to the device under test 2, as shown in FIG. 1. Further, the controller 101 controls the communication device 100 to communicate with a base station simulator 11 as shown in FIG. 1. By way of example, this communication encompasses making sure that the global navigation satellite system simulator and the base station simulator 11 cooperate with regard to the radio frequency global navigation satellite system signal and the real-time kinematic signal transmitted to the device under test 2.

The controller 101 can also control the base station simulator 11 through this connection. Alternatively, the global navigation satellite system simulator 10 can be controlled by this communication connection by the base station simulator 11.

Figure 3:
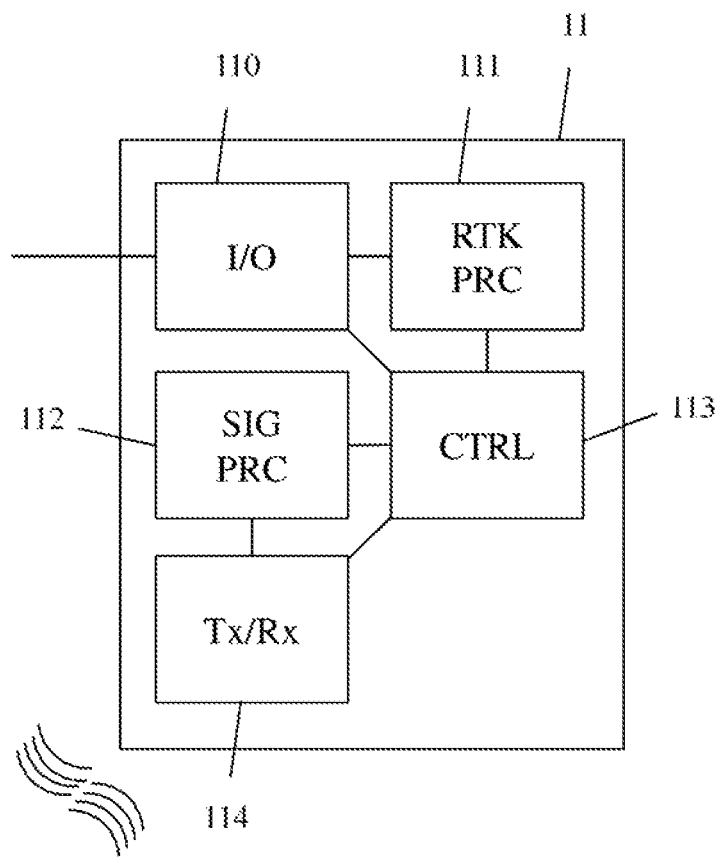
FIG. 3 shows an example block diagram of the base station simulator of FIG. 1, in accordance with example embodiments of the present invention.

FIG. 3 shows an example block diagram of the base station simulator 11 of FIG. 1, in accordance with example embodiments of the present invention. Here the construction and function of the base station simulator 11 is shown in greater detail. The base station simulator 11 comprises a communication device 110 connected to a real-time kinematic processor 111, which in turn is connected to a controller 113. The controller 113 is also connected to the communication device 110. Further, the base station simulator 11 comprises a signal processor 112, which is also connected to the controller 113. Further, the base station simulator 11 comprises a transceiver 114, which is connected to the controller 113 as well as to the signal processor 112.

The controller 113 controls the function of all other connected units. The communication device 110 serves the purpose of coordinating the measurement with the global navigation satellite system simulator 10 shown in FIG. 1 and FIG. 2. By way of example, this coordination encompasses making sure that the radio frequency global navigation satellite system signal and the real-time kinematic signal are coherent with each other. Also the communication device 110 can be used for either controlling the function of the global navigation satellite system simulator 10, by the base station simulator 11, or by receiving commands from the global navigation satellite system simulator, when it controls the base station simulator 11.

The real-time kinematic processor 111 determines the real-time kinematic signal and provides it to the signal processor 112 through the controller 113. Alternatively, it can be provided by a connection not displayed here, directly.

The signal processor 112 performs receiving and generating signals with regard to the device under test 2. By way of example, the signal processor 112 integrates the real-time kinematic signal into a transmission signal to be transmitted to the device under test 2. This transmission is handled by the transceiver 114, which generates the final radio frequency signal to be transmitted to the device under test and which also receives signals from the device under test 2. For example, the transceiver 114 receives a signal comprising location information from the device under test 2, from which the location, that the device under test has determined based on the global navigation satellite system signal and the real-time kinematic signal can be determined.

In one embodiment, the controller 113 of the base station simulator 11 additionally performs a comparison of a location determined by the device under test and an ideal location, upon which the radio frequency global navigation satellite system signal and the real-time kinematic signal are based. Therefrom, the controller 113 determines, if the device under test 2 performs the location tracking correctly.

In order to test the ability of the device under test 2 to operate under adverse conditions, artificial errors may be introduced into the radio frequency global navigation satellite system signal and/or the real-time kinematic signal. By way of example, this may be done by using different models to generate these signals. The intentional error can also be based upon an ionospheric grid model.

Further, differing orbital models for the radio frequency global navigation satellite system signal and the real-time kinematic signal can be employed.

The base station simulator 11 is not restricted to a specific type of base station. By way of example, a universal mobile telecommunications system (UMTS) base station or a Long Term Evolution (LTE) base station can be used.

The controller 113 is further adapted to determine if the device under test 2 uses receiver autonomous integrity monitoring, when a simulator satellite of the radio frequency global navigation satellite system signal and/or the real-time kinematic signal is mis-broadcasting.

Additionally or alternatively, the controller 113 can determine if the device under test 2 has a failsafe, if the device under test is unable to find appropriate data.

Additionally or alternatively, the controller 113 can determine if the device under test 2 disregards real-time kinematic data within the real-time kinematic signal, if the real-time kinematic data does not perform at a required standard.

The radio frequency global navigation satellite system signal and the real-time kinematic signal can be determined completely artificially from signal models. Alternatively, the signals can be real-world signals recorded in a specific scenario. Further, the signals can be determined based upon modified real-world signals.

The measuring device is further adapted to handle either one single global navigation satellite system standard, such as GPS, GLONASS, Galileo or Beidou signals, but also be adapted to handle two or even more different of the above-mentioned standards. This can be either alternatively, or even simultaneously. This is especially useful for testing devices under test, which can receive and process signals from different global navigation satellite system standards simultaneously. A GLONASS system (Globalnaja Nawigazionnaja Sputnikowaja Sistema) is a space-based satellite navigation system operating in the radio-navigation-satellite service (which provides an alternative to GPS and is the second navigational system in operation with global coverage and of comparable precision).

Figure 4:
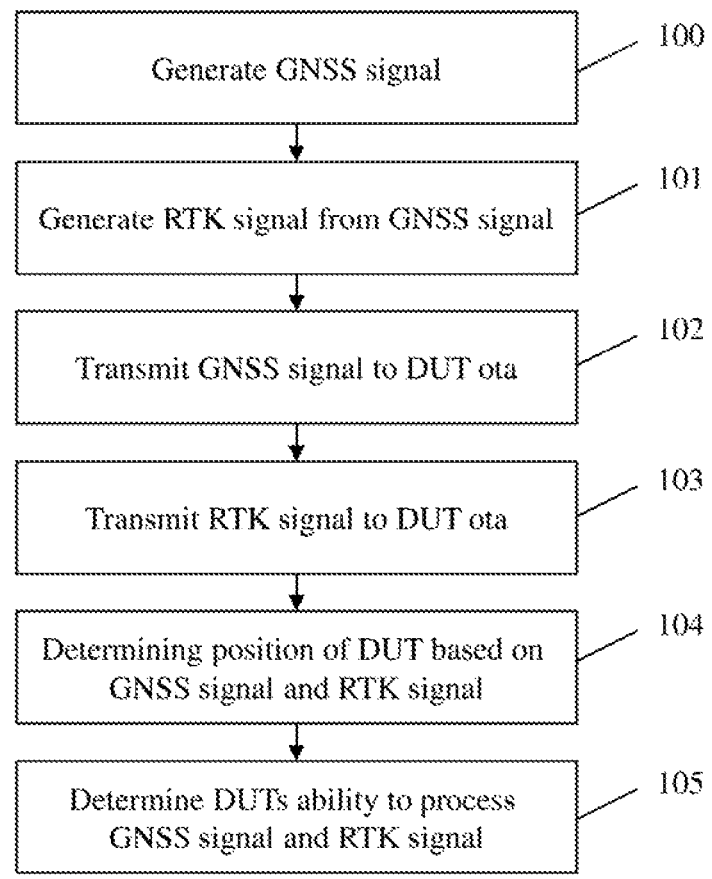
FIG. 4 shows a flow chart of an example method for testing a location tracking of a device under test, in accordance with example embodiments of the present invention.

FIG. 4 shows a flow chart of an example method for testing a location tracking of a device under test, in accordance with example embodiments of the present invention. In a first step 100, a radio frequency global navigation satellite system signal is generated. In a second step 101, a real-time kinematic signal is generated. In a third step 102, the radio frequency global navigation satellite system signal is transmitted to a device under test. In a fourth step 103, the real-time kinematic signal is transmitted to the device under test. In a fifth step 104, the position of the device under test is determined based upon the radio frequency global navigation satellite system signal and the real-time kinematic signal. In a final sixth step 105, the device under tests ability to process the radio frequency global navigation satellite system signal and the real-time kinematic signal, by comparing the determined location and an ideal location, upon which the radio frequency global navigation satellite system signal and the real-time kinematic signal are based.

The embodiments of the first aspect of the invention and of the third aspect of the invention very closely relate. All features shown in regard to the first aspect are also readily applicable to the third aspect.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to specific types of base stations, devices under test or satellite navigation standards. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

What is claimed is:

1. A measuring device for testing location tracking of a device under test, comprising:
   a global navigation satellite system simulator adapted to wirelessly transmit a radio frequency global navigation satellite system signal to the device under test; and
   a base station simulator adapted to wirelessly transmit a real-time kinematic signal to the device under test; and
   wherein the measuring device is adapted to compare a location, determined by the device under test based on the radio frequency global navigation satellite system signal and the real-time kinematic signal, with an ideal location, upon which the radio frequency global navigation satellite system signal and the real-time kinematic signal are based, and
   wherein one or more of the radio frequency global navigation satellite system signal and the real-time kinematic signal comprise at least one intentional error, and wherein the measuring device is adapted to determine a reaction of the device under test to the at least one intentional error.

2. The measuring device of claim 1, wherein the at least one intentional error is based on an ionospheric grid model, wherein a real-time kinematic model, upon which the real-time kinematic signal is based, differs from a global navigation satellite system model, upon which the radio frequency global navigation satellite system signal is based.

3. The measuring device of claim 1, wherein an orbit model used for determining the radio frequency global navigation satellite system signal differs from an orbit model used for determining the real-time kinematic signal.

4. The measuring device of claim 1, wherein the base station simulator is a Long Term Evolution (LTE) base station simulator, and wherein the base station simulator is adapted to send the real-time kinematic signal as part of an LTE system information block or as part of an LTE positioning protocol message or via LPPe.

5. The measuring device of claim 1, wherein the base station simulator is a Universal Mobile Telecommunications Service (UMTS) base station simulator.

6. The measuring device of claim 1, wherein the measuring device is adapted to determine one or more of:
   whether the device under test uses receiver autonomous integrity monitoring, when a simulated satellite of one or more of the radio frequency global navigation satellite system signal and the real-time kinematic signal is mis-broadcasting;
   whether the device under test has a failsafe, for when the device under test is unable to find appropriate data; and
   whether the device under test disregards real-time kinematic data within the real-time kinematic signal, when the real-time kinematic data does not perform at a required standard.

7. The measuring device of claim 1, wherein one or more of the radio frequency global navigation satellite system signal and the real-time kinematic signal are recorded real-world signals in a specific real-world scenario, or are derived from recorded real-world signals in a specific real-world scenario.

8. The measuring device of claim 1, wherein the real-time kinematic signal comprises correction data with regard to the radio frequency global navigation satellite system signal.

9. The measuring device of claim 1, wherein the measuring device is adapted to receive a positioning response signal from the device under test, indicating the location, which the device under test calculates based on the radio frequency global navigation satellite system signal and the real-time kinematic signal.

10. The measuring device of claim 1, wherein the base station is adapted to receive a positioning response signal from the device under test, indicating the location, which the device under test calculates based on the radio frequency global navigation satellite system signal and the real-time kinematic signal.

11. The measuring device of claim 1, wherein the radio frequency global satellite navigation signal comprises one of a Global Positioning System (GPS) signal, a Globalnaja Nawigazionnaja Sputnikowaja Sistema GLONASS signal, a Galileo signal, and a Beidou signal, or wherein the radio frequency global satellite navigation signal comprises at least two of a GPS signal, a GLONASS signal, a Galileo signal, and a Beidou signal.

12. A measuring system comprising:
a measuring device; and
a device under test; and
wherein the measuring device includes a global navigation satellite system simulator adapted to wirelessly transmit a radio frequency global navigation satellite system signal to the device under test, and a base station simulator adapted to wirelessly transmit a real-time kinematic signal to the device under test,
wherein the measuring device is adapted to compare a location, determined by the device under test based on the radio frequency global navigation satellite system signal and the real-time kinematic signal, with an ideal location, upon which the radio frequency global navigation satellite system signal and the real-time kinematic signal are based, and
wherein one or more of the radio frequency global navigation satellite system signal and the real-time kinematic signal comprise at least one intentional error, and wherein the measuring device is adapted to determine a reaction of the device under test to the at least one intentional error.

13. A measuring method for testing a location tracking of a device under test, comprising:
wirelessly transmitting a radio frequency global navigation satellite system signal to a device under test;
wirelessly transmitting a real-time kinematic signal to the device under test; and
comparing a location, determined by the device under test based on the radio frequency global navigation satellite system signal and the real-time kinematic signal, with an ideal location, upon which the radio frequency global navigation satellite system signal and the real-time kinematic signal are based; and
wherein one or more of the radio frequency global navigation satellite system signal and the real-time kinematic signal comprise at least one intentional error, and wherein the measuring device is adapted to determine a reaction of the device under test to the at least one intentional error.

14. The measuring method of claim 13, wherein the at least one intentional error is based on an ionospheric grid model, wherein a real-time kinematic model, upon which the real-time kinematic signal is based, differs from a global navigation satellite system model, upon which the radio frequency global navigation satellite system signal is based.

15. The measuring method of claim 13, wherein an orbit model used for determining the radio frequency global navigation satellite system signal differs from an orbit model used for determining the real-time kinematic signal.

16. The measuring method of claim 13, wherein the measuring method further comprises determining one or more of:
whether the device under test uses receiver autonomous integrity monitoring, when a simulated satellite of one or more of the global navigation satellite system signal and the real-time kinematic signal is mis-broadcasting;
whether the device under test has a failsafe, for when the device under test is unable to find appropriate data; and
whether the device under test disregards real-time kinematic data within the real-time kinematic signal, when the real-time kinematic data does not perform at a required standard.

17. The measuring method of claim 13, wherein one or more of the radio frequency global navigation satellite system signal and the real-time kinematic signal are recorded real-world signals in a specific real-world scenario, or are derived from recorded real-world signals in a specific real-world scenario.

* * * * *